(12) United States Patent
Fokraoui

(10) Patent No.: US 12,716,799 B2
(45) Date of Patent: Aug. 25, 2026

(54) ROBOTIZED TIRE-CHANGING AND BALANCING WORKSTATION AND ASSOCIATED METHOD

(71) Applicant: Hamza Fokraoui, Mirabel (CA)

(72) Inventor: Hamza Fokraoui, Mirabel (CA)

( * ) Notice: Subject to any disclaimer, the term of this patent is extended or adjusted under 35 U.S.C. 154(b) by 77 days.

(21) Appl. No.: 18/802,551

(22) Filed: Aug. 13, 2024

(65) Prior Publication Data

US 2025/0060268 A1 Feb. 20, 2025

Related U.S. Application Data

(60) Provisional application No. 63/532,468, filed on Aug. 14, 2023.

(51) Int. Cl.

| | |
|---|---|
| ***B60C 25/05*** | (2006.01) |
| ***B25J 9/16*** | (2006.01) |
| ***B25J 11/00*** | (2006.01) |
| ***G01M 1/02*** | (2006.01) |
| ***G01M 1/30*** | (2006.01) |

(52) U.S. Cl.

CPC ............. *G01M 1/02* (2013.01); *B25J 9/1697* (2013.01); *B25J 11/00* (2013.01); *B60C 25/0512* (2013.01); *B60C 25/0515* (2013.01); *G01M 1/30* (2013.01)

(58) Field of Classification Search

CPC .......... G01M 1/02; G01M 1/30; B25J 9/1697; B25J 11/00; B60C 25/0512; B60C 25/0515; B60C 25/132; B60C 25/138

USPC .......................................................... 700/259

See application file for complete search history.

(56) References Cited

U.S. PATENT DOCUMENTS

| | | | | |
|---|---|---|---|---|
| 11,648,677 | B2 * | 5/2023 | Taylor | B25J 19/023 700/245 |
| 2012/0144673 | A1 * | 6/2012 | Lawson | B60C 25/132 29/894.31 |
| 2012/0267055 | A1 * | 10/2012 | Rogalla | B25J 15/10 29/894.31 |
| 2013/0128281 | A1 * | 5/2013 | Montanari | G01B 11/2522 356/601 |
| 2017/0286888 | A1 * | 10/2017 | Merg | G07C 5/0808 |
| 2019/0255894 | A1 * | 8/2019 | Liebetreu | B60C 25/056 |
| 2021/0347058 | A1 * | 11/2021 | Chalofsky | B60C 25/0512 |
| 2023/0417616 | A1 * | 12/2023 | Chalofsky | G01M 1/28 |
| 2023/0417617 | A1 * | 12/2023 | Chalofsky | G01M 1/045 |
| 2024/0302240 | A1 * | 9/2024 | Campbell | B66C 1/44 |
| 2025/0060268 | A1 * | 2/2025 | Fokraoui | B60C 25/0515 |
| 2025/0229579 | A1 * | 7/2025 | Olsen | B60C 25/138 |
| 2025/0283772 | A1 * | 9/2025 | Chalofsky | G01M 1/28 |
| 2025/0314547 | A1 * | 10/2025 | Chalofsky | G01M 1/28 |

* cited by examiner

*Primary Examiner* — B M M Hannan

(74) *Attorney, Agent, or Firm* — Decode Legal Inc.

(57) ABSTRACT

A tire-changing and balancing workstation comprises a tire changer, a wheel balancer and a robot. A method allows the robot to pick up a wheel and tire assembly assembled on the tire changer and transfer it to the wheel balancer without human intervention.

18 Claims, 5 Drawing Sheets

ROBOTIZED TIRE-CHANGING AND BALANCING WORKSTATION AND ASSOCIATED METHOD

FIELD OF THE INVENTION

The subject matter disclosed generally relates to automotive mechanical maintenance. More specifically, it relates to an apparatus for a robot-aided tire changing in a garage setting.

BACKGROUND OF THE INVENTION

Tire changing in a garage setting is performed using machines known as a tire changer and a wheel balancer. For example, a new tire must first be installed on a wheel using the tire changer. Once assembled, this wheel and tire assembly must be balanced to prevent vibrations once installed on a car. These machines, however, do not do all the work by themselves and operator intervention and supervision are constantly required. For example, the wheel and tire assembly must be removed from the tire changer and brought to the wheel balancer by the operator. However, with modern wheels and tires increasing in size, they also increase in weight. The operator's tasks therefore become increasingly tedious, potentially leading to injuries.

SUMMARY OF THE INVENTION

It is an object of the present invention to provide a tire-changing and balancing workstation that overcomes or mitigates one or more disadvantages of known tire changers and wheel balancers, or at least provides a useful alternative.

The invention provides the advantages of assisting or helping operators during wheel and tire assemblies, which can be tedious.

In accordance with an embodiment of the present invention, there is provided a tire-changing and balancing workstation comprising a tire changer, a wheel balancer and a robot. The tire changer is used to mount a tire on a wheel, thereby creating a wheel and tire assembly. The wheel balancer is used to balance the wheel and tire assembly. The robot, which is equipped with a manipulator having a wrist and a gripper connected at a wrist is operable to grip the wheel and tire assembly. The manipulator is placed within reach of both the tire changer and the wheel balancer as allowing gripping and transferring the wheel and tire assembly in a transfer operation from the tire changer to the wheel balancer.

The controller may be connected to the tire changer. The controller is operable to send a first signal to the manipulator to pick up the wheel and tire assembly once a tire-mounting operation is completed. The controller may be further operable to receive a second signal from the tire-changing machine that the tire-mounting operation is completed. Moreover, the controller may further be connected to the wheel balancer, being then operable to send a third signal to the wheel-balancer once the transfer operation by the manipulator is completed. Optionally, the controller may further be operable to receive a fourth signal from the wheel balancer that a wheel balancing operation is completed. The controller may then send a fifth signal to the manipulator to remove the wheel and tire assembly from the wheel balancer in a removal operation.

The tire-changing and balancing workstation may further comprise a camera for detecting at least one attribute and/or a position of the wheel and tire assembly, a position of the wheel, a size of the wheel, a size of the tire, a shape of the wheel, a shape of the tire, a completion status of the wheel and tire assembly and a balancing status of the wheel and tire assembly.

The manipulator may further be equipped, either alternatively or additionally to the gripper, with a tool adapted to manipulate a securing device for securing the wheel and tire assembly on at least one of the tire changer and the wheel balancer.

Conveniently, the tire-changing and balancing workstation may further comprise a tool rack adapted for storing the gripper and the tool.

In accordance with another embodiment, there is provided a method of manipulating a wheel and tire assembly in the tire-changing and balancing workstation. The method comprises transferring the wheel and tire assembly from a tire changer to a wheel balancer using a manipulator.

The method may comprise at least one of:

a) securing the wheel on the tire changer using the manipulator;
b) releasing the wheel from the tire changer using the manipulator;
c) securing the wheel on the wheel balancer using the manipulator; and
d) releasing the wheel from the wheel balancer using the manipulator.

The securing and releasing the wheel may be performed using a tool adapted to manipulate the securing device. The tool is then connected to a wrist of the manipulator.

The transferring may comprise gripping the wheel and tire assembly from the tire changer using a gripper connected to a wrist of the manipulator.

The method may further comprise removing the wheel and tire assembly in a balanced state from the wheel balancer using the manipulator.

The method may also further comprise detecting a size of at least one of a tire and of a wheel of the wheel and tire assembly. This detecting may be done using a camera.

The method may further comprise mounting the tire on the wheel to create the wheel and tire assembly using the tire changer and balancing the wheel and tire assembly using the wheel balancer.

The method may also further comprise detecting completion of a mounting of the tire on the wheel; and detecting completion of a balancing of the wheel and tire assembly.

BRIEF DESCRIPTION OF DRAWINGS

These and other features of the present invention will become more apparent from the following description in which reference is made to the appended drawings wherein.

DETAILED DESCRIPTION OF THE INVENTION

The present invention relates to a tire-changing and balancing workstation and operation method that provides the advantages of assisting and helping manipulation by human operators of large and heavy wheel and tire assemblies.

The robotized tire-changing and balancing workstation in large parts automates the process of transferring the tire from the tire changer to the wheel balancer station. Usually, during the tire changing process, an operator must transfer the tire manually from one station to the other. With the present invention, this repetitive and fastidious task of the operator involving tire transfer between machines is now carried out by a robot.

Figure 1:
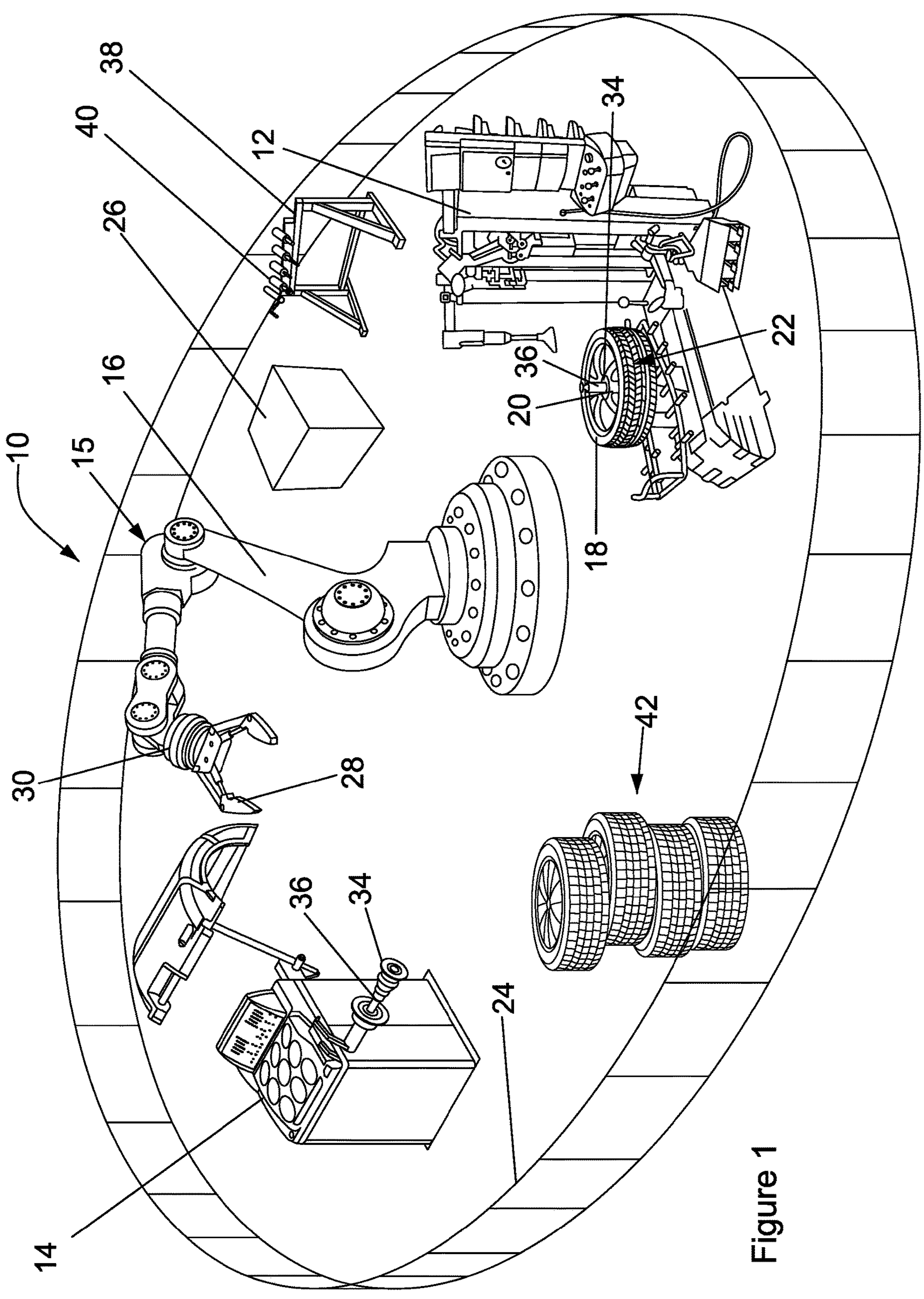
FIG. 1 is a schematic perspective view of a tire-changing and balancing workstation in accordance with an embodiment of the present invention.
Figure 2:
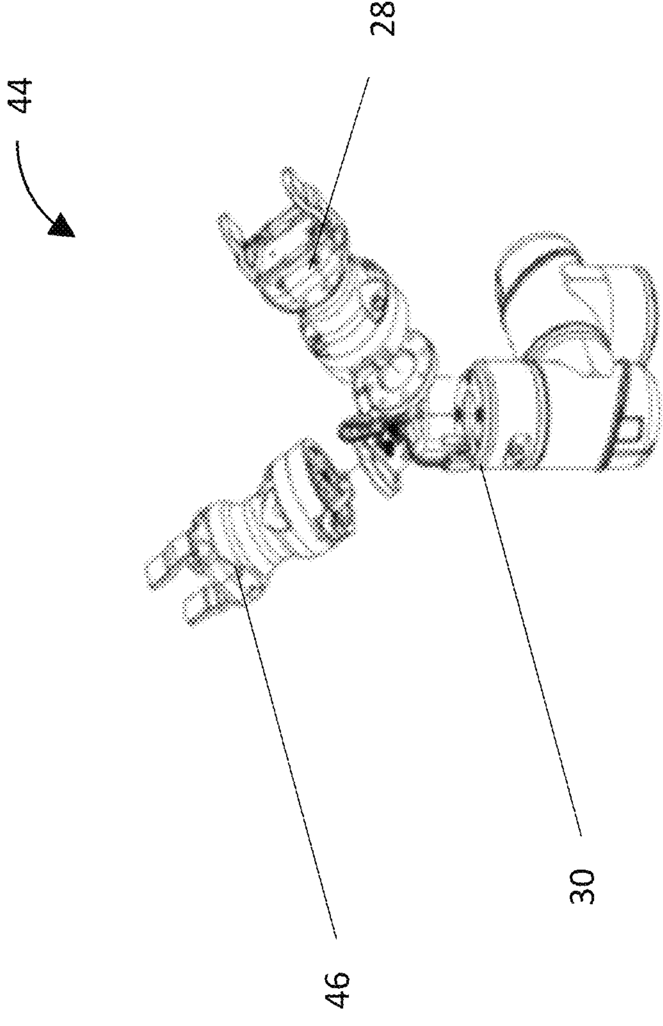
FIG. 2 is a view of an alternative multitool accessory to be used by a manipulator of the tire-changing and balancing workstation of FIG. 1.

FIG. 1 schematically depicts a tire-changing and balancing workstation 10 which comprises a tire changer 12, a wheel balancer 14 and a robot 15 made of a manipulator 16 and a controller 26 for controlling the manipulator 16. The tire changer 12, used to mount or remove a tire 18 on a wheel 20, thereby creating a wheel and tire assembly 22, is typically one that is known in the art, such as, for example, the Artiglio Master CODE™ tire changer by Corghi™. Similarly, the wheel balancer 14, used to balance the wheel and tire assembly 22 is also typically one that is known in the art such as the HD Elite™ wheel balancer from Hunter™. Robot 15, through its manipulator 16, is used to manipulate the wheel and tire assembly 22, in particular between the tire changer 12 and the wheel balancer 14. The robot 15 may be one that is known in the art such as the industrial robots manufactured by the Kuka™ brand. Manipulator 16 must of course be selected to have sufficient capacity to handle the range of weights of the wheel and tire assemblies 22 intended to be manipulated. The workstation 10 is delimited, at least partially with a safeguarding device 24, either physical or virtual, which prevents inadvertent contact between the manipulator 16 when it is in motion and a human user. The safeguarding device 24 is depicted as a physical fence in FIG. 1, preventing access to the workstation 10 when the manipulator 16 is active. The safeguarding device 24 must not be necessarily physical: it could also be a motion or presence detector, for example, a motion sensor, infrared sensor, a camera equipped with the right image recognition software, an RFID tag worn by the user, etc able to detect or notify human presence in the vicinity of the manipulator 16 or within the workstation 10, connected directly or through wireless technology to the controller 26 for sending a safety signal indicative of human presence within the area reserved to the workstation 10. Controller 26 then relates an emergency stop signal to the manipulators 16 to stop its movement in order to prevent an accident.

The manipulator 16 is equipped with a gripper 28 at a wrist 30 of the manipulator 16 for gripping the wheel and tire assembly 22. The manipulator 16 is positioned so as to be within reach of the wheel and tire assembly 22 when it is both on the tire changer 12 and on the wheel balancer 14 so as to be able to grip and transfer the wheel and tire assembly 22 in a transfer operation from the tire changer 12 to the wheel balancer 14.

As with many industrial robots, the manipulator 16 may be equipped with different tools at its wrist 30. For example, the manipulator 16 can be equipped, either alternatively or additionally to the gripper 28, with a tool, such as a securing tool, which is adapted to manipulate a securing device 34 for securing the wheel and tire assembly 22 on at least one of the tire changer 12 and the wheel balancer 14. This securing device 34 often takes the shape of a conical nut that is screwed on the horizontal of vertical spindle 36 of either the tire changer 12 and the wheel balancer 14. If appropriate, the gripper 28 itself may be used to secure the securing device 34.

Conveniently, the tire-changing and balancing workstation 10 may also be equipped with a tool changing station 38 to store the gripper 28 and other tools 40 adapted to fit the manipulator 16. The tool changing station 38 is preferably within reach of the manipulator 16 so that the manipulator can change its tool by itself.

For example, in case a change of tool 40 is required, when the manipulator 16 prepares to transfer the wheel and tire assembly 22 from the tire changer 12 to the wheel balancer 14, the manipulator 16 reaches to the tool changing station 38, detaches the tool it used (the Wheel Securing tool, or WS tool) to remove the securing device 34, attaches the gripper 28, grasps the wheel and tire assembly 22 in the tire changer 12, places the wheel and tire assembly 22 on the wheel balancer machine 14, reaches for the tool changing station 38 to change its gripper 28 to the WS tool appropriate to handle the securing device 34 and secures the wheel and tire assembly 22 on the wheel balancer 14 by screwing the securing device 34 with the WS tool.

As soon as the wheel and tire assembly 22 is finished balancing in the wheel balancer 14, the manipulator 16 releases the securing device 34 from the spindle 36 using the WS tool, reaches the tool changing station 38 to change the WS tool to the gripper 28, picks up the wheel and tire assembly 22 from the wheel balancer and transfer it to the storage area 42.

In order to save time, the manipulator 16 may be equipped at its wrist 30 with a multi-tool accessory 44, which for example, comprises both the gripper 28 and the WS tool 46 which are connected together at a right angle from each other. This is shown in FIG. 3 now concurrently referred to.

The locations of the tire changer 12, the wheel balancer 14, the tool changing station 38 and the storage area 42 are all within the manipulator's 16 reach or action perimeter. If either of these elements is not within reach of the manipulator 16, it is possible to equip the manipulator 16 with a means to move around the floor plan. For example, the industrial robot/manipulator 16 could be equipped with wheels to move on the floor or on tracks, air cushion, etc.

Figures 3A, 3B, 3C:
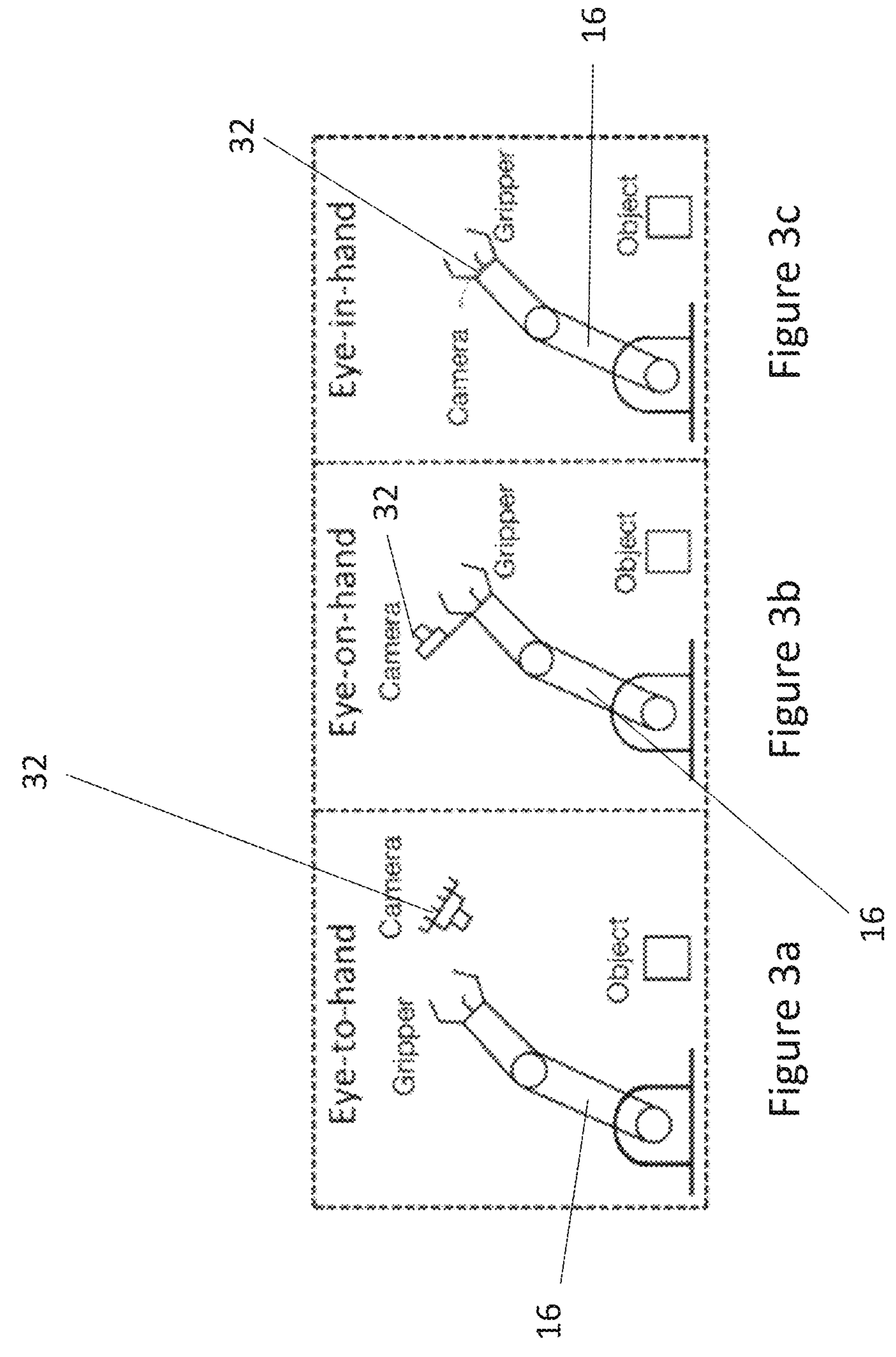
FIGS. 3*a*-3*c* are schematic views of different positions of the camera on the manipulator of the tire-changing and balancing workstation of FIG. 1.
Figure 4:
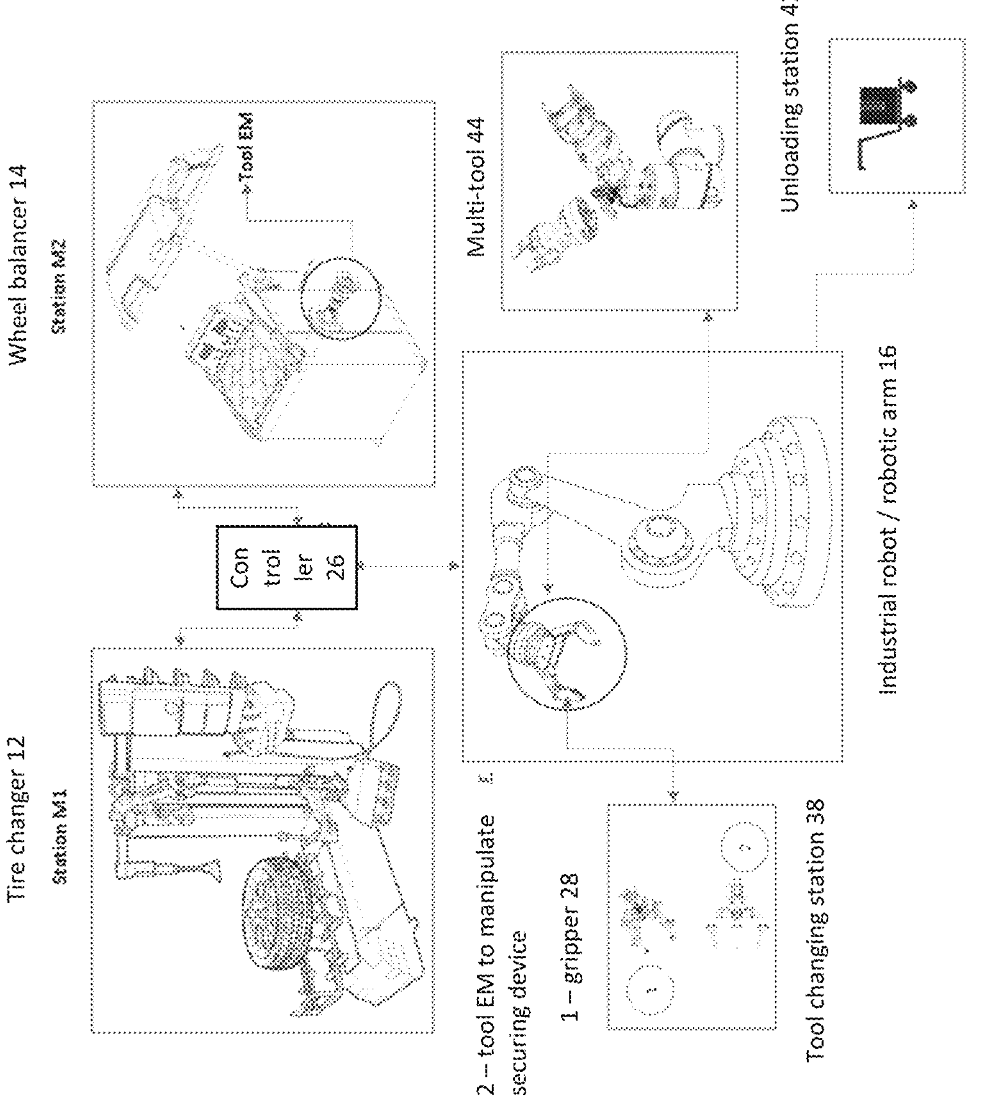
FIG. 4 is a communication diagram of the tire-changing and balancing workstation of FIG. 1.

As shown in FIGS. 3*a* to 3*c*, now concurrently referred to, the manipulator 16 may itself be equipped with artificial vision such as a high-resolution camera 32. The camera 32 is connected to the controller 26 and is used for detecting at least one of a position of the wheel and tire assembly 22, a position of the wheel 20, a size of the wheel 20, a position of the tire 18, a size of the tire 18, a shape of the wheel 20, a shape of the tire 18, a completion status of the wheel and tire assembly 22 and a balancing status of the wheel and tire assembly 22. The camera 32 is either placed directly on the manipulator 16, on a tool (such as the gripper 28), providing an "Eye-in-Hand" or "Eye-on-Hand" perspective, or remotely from the manipulator 16, providing an "Eye-in-Sky" perspective. The one or more cameras 32, may be placed remotely from the manipulator 16 ("Eye-to-Hand") at one or more locations where they can obtain a good vision of the wheel and tire assembly 22. Not only does the use of such camera 32 help with accurate positioning of the tool or gripper 28, it also provides the opportunity to observe the condition and attributes of the wheel 20 and tire 18 and provide a diagnostic which can be shared with the owner. For example, a recommendation to replace the tire could be automatically provided from such image analysis.

As the images from the camera 32 are analyzed by the controller, 26, the gripper 28 can automatically adjust its grasp by opening or closing according to the tire's size and diameter. Computer vision processing, done by controller 26, or by a remote computer connected to the controller 26, is based on a comprehensive database. The vision system of the controller 26 films, records and analyzes the data, and learns to distinguish between the images. It performs multiple data analyses until it finally perceives and recognizes the dimension of the tire 18 to be handled. The manipulator 16 is typically of known type and, in particular, can be of one of the following types: SCARA, articulated arm, polar, cylindrical, Cartesian or parallel robot. The robot 15 can be on an industrial type or not, in as much as it is adapted to a tire workshop environment.

Controller 26 may consist of a programmable logic controller (PLC) such as those manufactured by Allen Bradley, Siemens, Schneider, Omron, GE or other, a computer or a custom-made electronic circuit. It is connected to all sensors and machines such as the tire changer 12, the wheel balancer 14, the manipulator 16 (including any tool or the gripper 28 connected to it), the safeguarding device 24, the camera 32 and the tool changing station 38. It may be connected to further sensors or devices if advantageous. Controller 26 orchestrates exchanges between these various systems. It is primarily responsible for the administration and management of machine safety, in compliance with the Z434 and ISO 10218 standards.

Controller 26 is also operable to send a first signal to the manipulator 16 to pick up the wheel and tire assembly 22 once the tire-mounting operation is completed. The controller 26 may receive a second signal from the tire-changing machine 12 that the tire-mounting operation is completed, or it may rely on an image analysis, using images from the camera 32, that this operation is completed. Moreover, the controller 26 may be connected to the wheel balancer 14, being then operable to send a third signal to the wheel balancer 14 once the transfer operation by the manipulator 16 is completed. Controller 26 may further receive a fourth signal from the wheel balancer 14 that a wheel balancing operation is completed, or it may rely on an image analysis, using images from the camera 32, that this later operation is completed. Controller 26 then sends a fifth signal to the manipulator 16 to remove the wheel and tire assembly 22 from the wheel balancer 14 in a removal operation.

Using image recognition from images gathered with the camera 32, it is possible for the controller 26 to make the manipulator 16 pick-up individually the tire 18 and wheel 20 from an area within reach of the workstation 10 and place them in the right sequence (wheel 20 first, tire 18 second) on the tire-changing machine 12 for the next tire mounting operation. Again, this prevents an operator from having to pick up those rather heavy components.

The present tire-changing and balancing workstation 10 may be adapted to handle wheels and tires for different types of vehicles, that is by handling different types, sizes and weight of wheels 20 and tires 18. For example, the tire-changing and balancing workstation 10 could be adapted to handle wheels and tires of different vehicles requiring tire-balancing such as motorcycles, cars, Sport Utility Vehicles, pick-up trucks, recreation vehicles, commercial trucks, trailers, semi-trailers, buses, rubber-tire wheeled metros and monorails, etc. The only difference is that the required equipment such as the tire-changer machine 12, the wheel-balancer machine 14 and/or the robot 15 must be sized accordingly to be capable of handling the weight and size of the tire 18, the wheel 20 and/or the wheel and tire assembly 22.

The tire-changer machine 12, the wheel-balancer machine 14 and the robot 15 are described herein, and represented in the figures, as three separate components. However, they could also be part of a single machine that incorporates all these functions.

In another embodiment, a method of manipulating the wheel and tire assembly 22 in the tire-changing and balancing workstation 10 is described. An automatic sequencing and operating mode of the workstation 10 is illustrated on diagram illustrated in FIG. 5, now concurrently referred to.

The method is centered around transferring the wheel and tire assembly 22 assembled with the tire changer 12 from the tire changer 12 to the wheel balancer machine 14 using the manipulator 16. Other steps performed before or after this transfer may either be performed by a human operator or by the robot 15.

Figure 5:
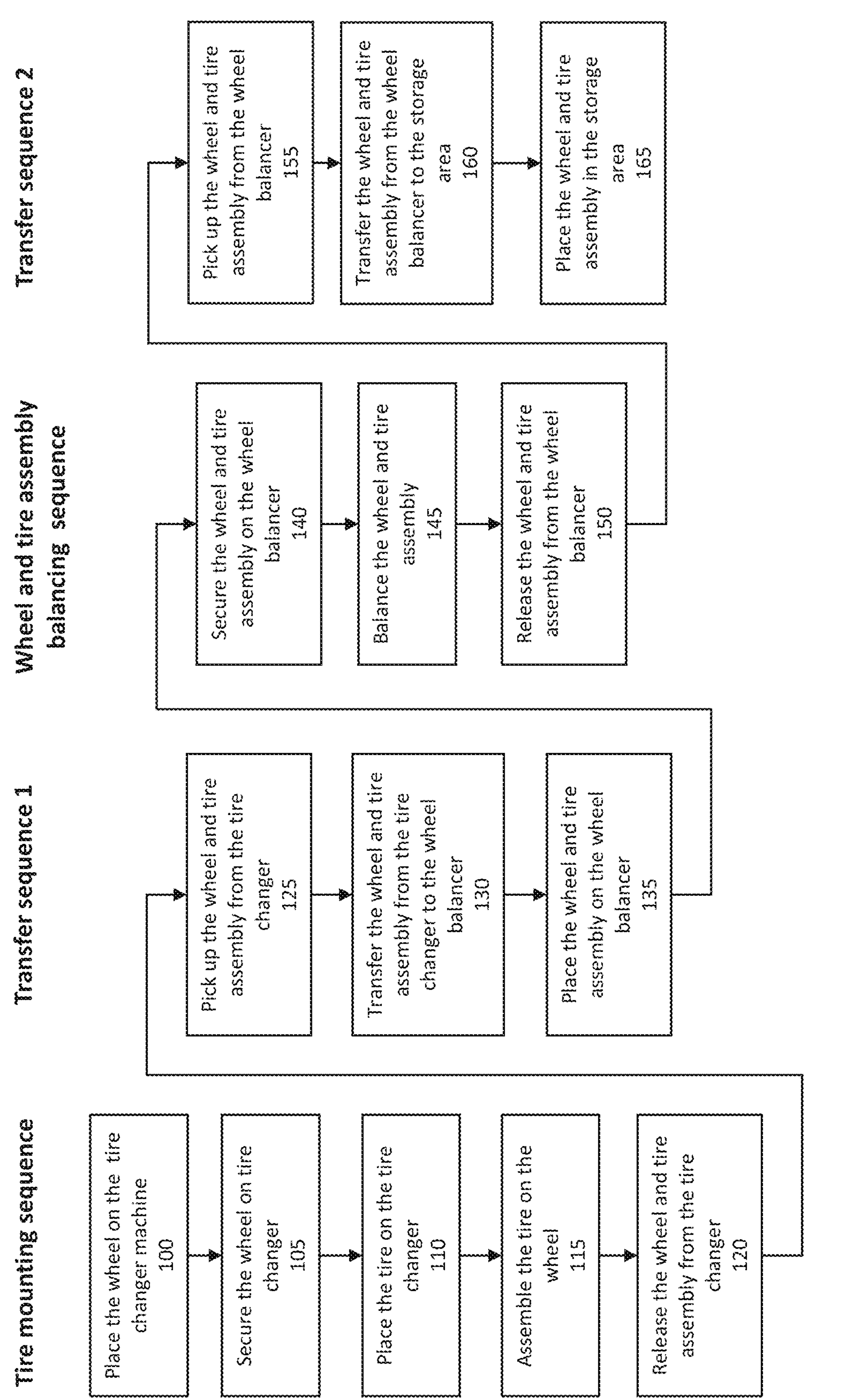
FIG. 5 is a workflow of a method of manipulating a wheel and tire assembly in the tire-changing and balancing workstation of FIG. 1.

Referring to FIG. 5, the method comprises the following steps:

The first sequence is the tire mounting sequence, which comprises:

a) Placing 100 the wheel 20 on the tire changer 12;
b) Securing 105 the wheel 20 on the tire changer 12;
c) Placing 110 the tire 18 on the tire changer 12;
d) Assembling 115 the tire 18 on the wheel 20 using the tire changer 12; and
e) Releasing 120 the wheel and tire assembly 22 from the tire changer 12.

The second sequence is the transfer sequence 1, which comprises:

f) Picking up 125 the wheel and tire assembly 22 from the tire changer 12;
g) Transferring 130 the wheel and tire assembly 22 to the wheel balancer 14; and
h) Placing 135 the wheel and tire assembly 22 on the wheel balancer 14.

The third sequence is the wheel and tire assembly balancing sequence, which comprises:

i) Securing 140 the wheel and tire assembly 22 on the wheel balancer 14;
j) Balancing 145 the wheel and tire assembly 22 using the wheel balancer 14; and
k) Releasing 150 the wheel and tire assemble from the wheel balancer 14.

The fourth sequence is the transfer sequence 2, which comprises:

l) Picking up 155 the wheel and tire assembly 22 from the wheel balancer 14;
m) Transferring 160 the wheel and tire assembly 22 to the storage area 42; and
n) Placing 165 the wheel and tire assembly 22 in the storage area.

Any step a) to e) and i) to n) (references 100 to 120 and 140 to 165) can be performed either by the robot 15 or by a human operator. Steps f) to h) (references 125 to 135) are specifically performed by the robot 15.

If the manipulator 16 is used for the securing and releasing operations (steps b), e), i) and k), corresponding to references 105, 120, 140 and 150), the manipulator 16 may be required to change the gripper 28 for the specialized WS tool 46, depending on the shape of the securing device 34 used.

The coordination between steps can be manually provided by the operator or orchestrated through controller 26. Although most or all of the steps may be performed by one or more of the machines such as the manipulator 16, the tire changer 12 and the wheel balancer 14, some human operators may still prefer performing selected steps by themselves. For example, when, in the second sequence, the manipulator 16 places at step 135 the wheel and tire assembly 22 on the wheel balancer 14, the human operator may prefer to perform the securing 140 step of securing the wheel and tire assembly 22 on the wheel balancer 14 by himself, while the manipulator 16 is still supporting the weight and holding in place the wheel and tire assembly 22 on the wheel balancer 14. For example, this would be especially convenient with older models of wheel balancers 14. In such cases, whenever the human operator enters the area of the tire-changing and balancing workstation 10 inside the area delimited by the safeguarding device 24 while at least one of the sequences is being performed, the controller 26 freezes the movements of the manipulator 16 to ensure the safety of the human operator.

Although one or many steps may selectively be manually performed, an example of a fully automated sequence is now provided. In this example, it is assumed that gripper 28 is fully capable of securing and releasing the securing device 34. If this is not possible, the manipulator 16 must change its gripper 28 for the WS tool 46 and vice versa as required to perform the next action. In this example, it is also assumed that both the tire changer 12 and the wheel balancer 14 are connected to the controller 26 and can communicate with it. An alternative to having this connection is using the camera 32 and image recognition, or simply operator intervention, to trigger an equivalent signal as that which would have been sent or received by the tire changer 12 and/or the wheel balancer 14. The fully automated method goes as follows:

The first sequence is the tire mounting sequence, which comprises:

a) Placing 100 the wheel 20 on the tire changer 12. Upon receiving a command to start, the controller 26 detects the wheel 20 in a work zone of the workstation 10 using the camera 32 and send a signal to the manipulator 16 to grip it and place it on the tire changer 12;

b) Securing 105 the wheel 20 on the tire changer 12. Once a) is completed, the controller 26 sends a signal to the manipulator 16 to place the securing device 34 to lock the wheel 20 in place on the spindle 36 of the tire changer 12;

c) Placing 110 the tire 18 on the tire changer 12. Once b) is completed, the controller 26 detects the tire 18 in a work zone of the workstation 10 using the camera 32 and send a signal to the manipulator 16 to grip it and place it appropriately on the tire changer 12. The controller 26 orders the manipulator 16 to move out of the way for the next operation;

d) Assembling 115 the tire 18 on the wheel 20 using the tire changer 12; and e) Releasing 120 the wheel and tire assembly 22 from the tire changer 12. Once d) is completed, the tire changer 12 sends a step completed signal to the controller 26, which then sends a signal to the manipulator 16 to remove the securing device 34 to unlock the wheel and tire assembly 22 from the tire changer 12.

f) Picking up 125 the wheel and tire assembly 22 from the tire changer 12. Once e) is completed, the controller 26 sends a signal to the manipulator to pick up the wheel and tire assembly 22. The pick up operation requires placing the gripper 26 in close proximity to the wheel and tire assembly 22, and may further require measurements of the tire size or wheel pattern in order for the controller 26 to determine the best way to grab the wheel and tire assembly 22;

g) Transferring 130 the wheel and tire assembly 22 to the wheel balancer 14. Once the wheel and tire assembly 22 is safely picked up, the controller 26 instruct the manipulator 16 to transfer it in close proximity to the wheel balancer 14; and h) Placing 135 the wheel and tire assembly 22 on the wheel balancer 14. Once in close proximity, the controller 26, instruct the manipulator 16 to place the wheel and tire assembly on the spindle of the wheel balancer 14. Alternatively, steps g) and h) can be combined if the exact position of a mounting flange and spindle of the wheel balancer is known.

The third sequence is the wheel and tire assembly balancing sequence, which comprises:

i) Securing 140 the wheel and tire assembly 22 on the wheel balancer 14. Once step h) is completed, the controller 26 send a signal to the manipulator 26 to secure in place the wheel and tire assembly 22 using the securing device 34;

j) Balancing 145 the wheel and tire assembly 22 using the wheel balancer 14. Once step i) is completed, controller 26 sends a signal to the wheel balancer to start balancing the wheel. Details about the wheel and tire sizes (diameter, width, weight, etc) may also be provided at the same time by the controller if this information was acquired by the image recognition system. The wheel balancer 14 proceeds to balance the wheel and tire assembly. Operator intervention may be required to place weight on the wheel 20, although this step could also be performed by the manipulator 16 through adequate communication between the wheel balancer 14 and the controller 26.

k) Releasing 150 the wheel and tire assemble from the wheel balancer 14. Once balancing is completed, the wheel balancer 14 sends a signal to the controller 26 to release the wheel and tire assembly. Upon receiving this signal, the controller instructs the manipulator 26 to remove the securing device 34 from the spindle 36 of the wheel balancer 14.

The fourth sequence is the transfer sequence 2, which comprises:

l) Picking up 155 the wheel and tire assembly 22 from the wheel balancer 14. Once step k) is completed, the controller 26 instructs the manipulator 16 to pick up the wheel and tire assembly 22 from the wheel balancer. As the information is already known as to the tire and wheel dimensions, the controller 26 may send the manipulator 26 exactly at the right position to pick up the wheel and tire assembly 22 using the gripper 28; and m) Transferring 160 the wheel and tire assembly 22 to the storage area 42. Once picked up, the controller 26 sends a signal to the manipulator 16 to transfer the wheel and tire assembly to the storage area;

n) Placing 165 the wheel and tire assembly 22 in the storage area. Controller 26 instructs the manipulator 16 to release the wheel and tire assembly and a preselected place, or at a frees space detected by the imaging system. The controller 26 also kept in memory exactly where the previous wheel and tire assembly 22 was placed within the storage area so it is possible for the controller 26 to send an instruction to the manipulator 16 to, for example, form a pile with a set of four wheel and tire assemblies 22.

Once the sequence is completed, the controller 26 instructs the manipulator to retreat in a safe area which is out of the way of the human operator.

The present invention has been described with regard to preferred embodiments. The description as much as the drawings were intended to help the understanding of the invention, rather than to limit its scope. It will be apparent to one skilled in the art that various modifications may be made to the invention without departing from the scope of the invention as described herein, and such modifications are intended to be covered by the present description. The invention is defined by the claims that follow.

What is claimed is:

1. A tire-changing and balancing workstation for assembling a tire to a wheel to create a wheel and tire assembly, the tire-changing and balancing workstation comprising:

a tire changer for mounting the tire on the wheel, to thereby create the wheel and tire assembly;

a wheel balancer for balancing the wheel and tire assembly;

a robot having:

a manipulator, the manipulator having a wrist and a gripper connected to the wrist, the gripper being operable to grip the wheel and tire assembly;

a controller connected to the manipulator; and a securing device, the manipulator being configured to manipulate the securing device to secure the wheel on the tire changer or the wheel and tire assembly on the wheel balancer, wherein the manipulator is placed within reach of both the tire changer and the wheel balancer so as to grip and transfer the wheel and tire assembly in a transfer operation from the tire changer to the wheel balancer.

2. The tire-changing and balancing workstation of claim 1, wherein the controller is connected to the tire changer, the controller being configured to send a first signal to the manipulator to pick up the wheel and tire assembly once a tire-mounting operation is completed.

3. The tire-changing and balancing workstation of claim 2, wherein the controller is configured to receive a second signal from the tire changer that the tire-mounting operation is completed.

4. The tire-changing and balancing workstation of claim 2, wherein the controller is further connected to the wheel balancer, the controller being configured to send a third signal to the wheel-balancer once the transfer operation by the manipulator is completed.

5. The tire-changing and balancing workstation of claim 4, wherein the controller is configured to receive a fourth signal from the wheel balancer that a wheel balancing operation is completed.

6. The tire-changing and balancing workstation of claim 5, wherein the controller is configured to send a fifth signal to the manipulator to remove the wheel and tire assembly from the wheel balancer in a removal operation.

7. The tire-changing and balancing workstation of claim 1, further comprising a camera for detecting at least one of a position of the wheel and tire assembly, a position of the wheel, a size of the wheel, a size of the tire, a shape of the wheel, a shape of the tire, a completion status of the wheel and tire assembly and a balancing status of the wheel and tire assembly.

8. The tire-changing and balancing workstation of claim 1, wherein the manipulator further comprises a tool adapted for manipulating the securing device for securing the wheel on the tire changer or the wheel and tire assembly on the wheel balancer.

9. The tire-changing and balancing workstation of claim 8 further comprising a tool rack adapted for storing the gripper and the tool.

10. A method of manipulating a wheel and a wheel and tire assembly in a tire-changing and balancing workstation, the wheel and tire assembly being made of a tire mounted on the wheel, the method comprising:

providing the tire-changing and balancing workstation of claim 1;

securing the wheel on the tire changer using the manipulator, the manipulator manipulating the securing device to secure the wheel;

transferring the wheel and tire assembly from the tire changer to the wheel balancer using the manipulator; and securing the wheel and tire assembly on the wheel balancer, the manipulator manipulating the securing device to secure the wheel and tire assembly.

11. The method of claim 10, further comprising:

releasing the wheel and tire assembly from the tire changer using the manipulator, the manipulator releasing the securing device; and releasing the wheel and tire assembly from the wheel balancer using the manipulator, the manipulator releasing the securing device.

12. The method of claim 11, wherein the securing and releasing the wheel are performed using a tool adapted to manipulate a securing device, the tool being connected to the wrist of the manipulator.

13. The method of claim 10, wherein the transferring comprises gripping the wheel and tire assembly from the tire changer using a gripper connected to a wrist of the manipulator.

14. The method of claim 13, further comprising removing the wheel and tire assembly in a balanced state from the wheel balancer using the manipulator.

15. The method of claim 10, further comprising detecting a size of a tire or of a wheel of the wheel and tire assembly.

16. The method of claim 15, wherein the detecting is done using a camera.

17. The method of claim 10 further comprising:

mounting of the tire on the wheel to create the wheel and tire assembly using the tire changer; and balancing the wheel and tire assembly using the wheel balancer.

18. The method of claim 17, further comprising:

detecting completion of a mounting of the tire on the wheel; and detecting completion of a balancing of the wheel and tire assembly.

* * * * *